US010223945B2

(12) United States Patent
Schmidt et al.

(10) Patent No.: US 10,223,945 B2
(45) Date of Patent: Mar. 5, 2019

(54) LIGHTING DISPLAY SYSTEM

(71) Applicant: Maas & Roos AG, Hilpoltstein (DE)

(72) Inventors: Rainer Schmidt, Heideck (DE);
Jochen Kleblein, Pleinfeld (DE);
Alexander Burrak, Schwabach (DE);
Alexander von der Grün, Hilpoltstein (DE)

(73) Assignee: Maas & Roos AG, Hilpoltstein (DE)

( * ) Notice: Subject to any disclaimer, the term of this patent is extended or adjusted under 35 U.S.C. 154(b) by 2 days.

(21) Appl. No.: 15/442,358

(22) Filed: Feb. 24, 2017

(65) Prior Publication Data
US 2017/0162087 A1 Jun. 8, 2017

Related U.S. Application Data

(63) Continuation of application No. PCT/EP2015/001684, filed on Aug. 14, 2015.

(30) Foreign Application Priority Data

Aug. 25, 2014 (DE) .................. 10 2014 012 686

(51) Int. Cl.
G09F 13/04 (2006.01)
G09F 7/06 (2006.01)
(Continued)

(52) U.S. Cl.
CPC .......... *G09F 13/0404* (2013.01); *F21V 23/06* (2013.01); *G09F 7/06* (2013.01);
(Continued)

(58) Field of Classification Search
CPC ...... G09F 13/0404; G09F 13/04; G09F 13/00; G09F 13/26; G09F 7/08
See application file for complete search history.

(56) References Cited

U.S. PATENT DOCUMENTS 3,553,870 A * 1/1971 Rudolph ............. G09F 13/0404
40/576
3,755,943 A * 9/1973 Cesarotti ............. G09F 13/0404
40/552
(Continued)

FOREIGN PATENT DOCUMENTS

DE 19745353 A1 4/1999
DE 10036231 A1 2/2001
(Continued)

OTHER PUBLICATIONS

International Search Report, European Patent Office, Oct. 20, 2015, Lechanteux, Alice.
Richter et al.; "Bauelemente Der Feinmechanik", Veb Verlag Technik Berlin, 1959.

*Primary Examiner* — Cassandra Davis
(74) *Attorney, Agent, or Firm* — Park, Vaughan, Fleming & Dowler LLP

(57) ABSTRACT

The invention relates to a lighting display system (1), comprising: a mounting structure (3), which comprises a mounting plate (7) having a front side (13); at least one first plug contact (15) arranged on the front side (13) of the mounting plate (7); and an electrical power supply connection (17), which is electrically connected to the at least one first plug contact (15); at least one luminous body (5), which comprises a front side (19) and a back side (21); a second plug contact (23), which is arranged on the back side (21) of the at least one luminous body (5) and which can be plugged together with and electrically connected to the first plug contact (15); and a plurality of light sources (27), which are electrically connected to the second plug contact (23); wherein the at least one luminous body (5) can be secured to the mounting structure (7) by means of least one securing assembly (29), wherein a first element (31) of the at least one securing assembly (29) is firmly connected to the back side (21) of the at least one luminous body (5), a second element (Continued)

(33) of the at least one securing assembly (29) is firmly connected to the front side (13) of the mounting plate (7), and a third element (35) of the at least one securing assembly (29) is configured to connect the first and the second element of the at least one securing assembly (29) to each other in a positive-locking manner.

28 Claims, 8 Drawing Sheets

(51) Int. Cl.
  *F21V 23/06* (2006.01)
  *G09F 7/18* (2006.01)
  *F16B 21/07* (2006.01)
  *F21Y 115/10* (2016.01)

(52) U.S. Cl.
  CPC .............. *G09F 7/18* (2013.01); *F16B 21/073* (2013.01); *F21Y 2115/10* (2016.08)

(56) References Cited

U.S. PATENT DOCUMENTS

| | | |
|---|---|---|
| 4,028,828 A | 6/1977 | Chao et al. |
| 4,108,560 A * | 8/1978 | Minogue ............... F16B 5/0233 248/466 |
| 7,685,753 B2 * | 3/2010 | Slowski .................. G09F 13/04 362/248 |
| 8,695,253 B2 * | 4/2014 | Bednarksi ................ G09F 7/18 248/475.1 |
| 2010/0110688 A1 * | 5/2010 | Burrak ................ G09F 13/0404 362/249.14 |
| 2014/0075796 A1 | 3/2014 | Bednarski et al. |

FOREIGN PATENT DOCUMENTS

| | | |
|---|---|---|
| DE | 202007007437 | 10/2007 |
| EP | 2071200 A1 | 12/2007 |
| WO | 2008017293 A1 | 2/2008 |

* cited by examiner

LIGHTING DISPLAY SYSTEM

CROSS-REFERENCES TO RELATED APPLICATIONS

The present application is a continuation of, and claims benefit under 35 USC 120 to, international application PCT/EP2015/001684, filed Aug. 14, 2015, which claims benefit under 35 USC 119 of German Application No. 10 2014 012 686.2, filed Aug. 25, 2014. The entire disclosure of international application PCT/EP2015/001684 is incorporated by reference herein.

FIELD

The invention relates to a lighted display panel system, and in particular a lighting lighted display panel system which comprises one or a plurality of luminous bodies which can be arranged on a mounting structure.

BACKGROUND

Conventional lighted display panel system typically comprise a plurality of luminous bodies which can be arranged on a mounting structure. The luminous bodies can be connected to the mounting structure by means of simple plug connections, whereby the luminous bodies can easily be installed on the mounting structure and held thereby.

This frequently gives rise to the problem that the luminous bodies can easily be removed from the mounting structure, e.g. by wind or by being pulled off the mounting structure. As a result, the range of application of such lighted display panel systems is greatly restricted.

SUMMARY

Therefore, it is an object of the present invention to propose a lighted display panel system which permits a relatively large range of application, in particular inside and outside rooms and buildings, and in areas where people are present.

One embodiment of the lighted display panel system in accordance with the invention comprises a mounting structure and at least one luminous body. The mounting structure comprises a mounting plate having a front side, at least one first plug contact, which is arranged arranged on the front side of the mounting plate, and a power supply connection which is electrically connected to the at least one first plug contact and which can be connected to a power supply.

The at least one luminous body comprises a front side and a rear side, which is defined by a peripheral edge, a second plug contact which is arranged on the rear side of the at least one luminous body and can be plugged together with and electrically connected to the first plug contact, and a plurality of light sources which are electrically connected to the second plug contact.

The at least one luminous body can be secured on the mounting structure by means of at least one securing assembly, wherein a first element of the at least one securing group is fixedly connected to the rear side of the at least one luminous body, a second element of the at least one securing assembly is fixedly connected to the rear side of the at least one luminous body and a third element of the at least one securing assembly is configured to connect the first element and the second element of the at least one securing assembly to one another in a positive-locking manner.

The mounting plate can be fastenable e.g. to a wall or a front plate. However, the wall or the front plate can itself also be considered to be a mounting plate in terms of the invention. Therefore, the wall functions as a mounting plate.

The at least one first plug contact which is arranged on the front side of the mounting plate, and the second plug contact which is arranged on the rear side of the at least one luminous body can be plugged together, whereby both a mechanical and electrical connection can be established between the at least one first and the second plug contact. Such a first and second plug contact can be formed e.g. by a pair of plugs or conventional plugs, in particular banana plugs or coaxial plugs or the like, and mating plugs thereof.

The at least one luminous body comprises a plurality of light sources which are arranged e.g. in the interior of the at least one luminous body and can be connected to a power supply by means of the at least one first and second plug contact.

One embodiment has at least one securing assembly by means of which the at least one luminous body can be secured to the mounting structure, in particular to the mounting plate. As a result, it is possible to protect the at least one luminous body from being stolen or to protect it from being otherwise (undesirably) removed from the mounting structure.

According to a further embodiment, the positive-locking connection can be established between the first element and the second element of the at least one securing assembly in that firstly the third element of the at least one securing assembly is arranged on the second element of the at least one securing assembly in a position configured for securing purposes, and then the first element is positioned relative to the second element of the at least one securing assembly such that the third element connects the first element to the second element in a positive-locking manner.

When the lighted display panel system is being installed e.g. on a wall or a front plate, it is possible in this manner firstly to prepare the part of the securing assembly which is arranged on the mounting plate. In particular, the third element can be arranged on the second element such that said elements are ready to secure the first element. Subsequently, in order to secure the at least one luminous body to the mounting structure only the first element still has to be positioned relative to the second element such that a positive-locking connection between the first element and the second element is established by means of the third element.

According to a further embodiment, the positive-locking connection which is provided by the at least one securing assembly prevents displaceability of the first element and the second element of the at least one securing assembly relative to one another in one, two or three translational directions and/or in one, two or three rotational directions. As a result, as soon as the positive-locking connection exists between the first element and the second element, the at least one luminous body is restricted in terms of in its degrees of freedom of movement relative to the mounting structure such that removal of the at least one luminous body from the mounting structure is prevented.

According to a further embodiment, the positive-locking connection provided by the at least one securing assembly can be released in a damage-free manner exclusively by removal of the third element of the at least one securing assembly from the position configured for securing purposes. This ensures that the positive-locking connection can be released in a damage-free manner by a single action, namely the removal of the third element from the position configured for securing purposes. In a preferred embodiment, provision is made that the third element can be removed from the position configured for securing purposes exclusively in a direction in parallel with the mounting plate.

In order to make it more difficult to remove the third element from the position configured for securing purposes, the lighted display panel systems is designed in a particular manner: The at least one luminous body, the at least one securing assembly and the mounting plate are arranged and dimensioned such that the positive-locking connection cannot be released without the use of special tools. In particular, the positive-locking connection cannot be released exclusively by hand.

For this purpose, according to a further embodiment a distance between the rear side of the at least one luminous body and the front side of the mounting plate is less than 5 cm, less than 3 cm, less than 1 cm or less than 0.5 cm. Restricting the distance between the rear side of the at least one luminous body and the front side of the mounting plate ensures that it is not possible as a matter of course to effect engagement between the at least one luminous body and the mounting plate, in particular to effect engagement in order to release the positive-locking connection and remove the third element. In particular, this distance can be maintained such that a special tool is required for removing the third element from the position configured for securing purposes.

According to a further embodiment, a minimum distance between the peripheral edge, which defines the rear side of the at least one luminous body, and the first element, which is fixedly connected to the rear side of the at least one luminous body, of the at least one securing assembly is greater than 1 cm, greater than 2 cm, greater than 3 cm, greater than 5 cm or greater than 10 cm. As a result, the first element of the at least one securing assembly is removed from the peripheral edge of the rear side of the at least one luminous body at least to such an extent that the positive-locking connection cannot be released as a matter of course, in particular the third element cannot be removed as a matter of course.

According to a further embodiment, the ratio of a distance between the rear side of the at least one luminous body and the front side of the mounting plate to a minimum distance between the peripheral edge, which defines the rear side of the at least one luminous body, and the first element, which is fixedly connected to the rear side of the at least one luminous body, of the at least one securing assembly is less than 1, less than 3/4, less than 1/2, less than 1/4, less than 1/5 or less than 1/6. Restricting this ratio ensures that the first element is removed from the peripheral edge of the rear side of the at least one luminous body to such an extent that the third element cannot be reached and removed as a matter of course, wherein this extent is set based on the distance between the rear side of the at least one luminous body and the front side of the mounting plate.

According to a further embodiment, the first element of the at least one securing assembly and the second element of the at least one securing assembly have individually or in each case apertures and the third element of the at least one securing assembly is configured to engage into the apertures of the first element and/or the second element. In this embodiment, the first element and the second element are formed by apertures such that the third element can establish the positive-locking connection in that the third element engages into the apertures.

According to a further embodiment, one of the first element and the second element of the at least one securing assembly comprises a pin which has an proximal portion and a distal portion in a longitudinal direction of the pin, wherein a width of the distal portion of the pin is greater than a width of the proximal portion of the pin, wherein the width of the portions of the pin is an expansion of the pin as measured in a direction oriented perpendicularly with respect to the longitudinal direction. Furthermore, in this embodiment the other one of the first element and the second element of the at least one securing assembly comprises a pin receiver which is configured to receive the distal portion and at least a part of the proximal portion of the pin. Furthermore, the third element of the securing assembly can be connected to the second element of the securing assembly such that, if the pin is introduced with at least a part of the proximal portion into the pin receiver, the third element engages behind the distal portion of the pin in the proximal portion of the pin. In this embodiment, the positive-locking connection can be established in that the third element in the position configured for securing purposes is arranged on the second element such that, if the pin which is arranged on the first element or the second element of the at least one securing assembly is introduced into the pin receiver which is arranged on the other one of the two elements, the third element engages behind the pin and thus prevents removal of the pin from the pin recess. As a result, firstly the third element can be moved to the position configured for securing purposes before the pin is introduced into the pin recess. In order to close the positive-locking connection, the luminous body must then merely be plugged onto the mounting structure, i.e. the pin must be introduced into the pin recess.

According to a further embodiment, the third element of the at least one securing assembly is a U-shaped splint which can be removed from the second element and can be arranged thereon, preferably in a direction in parallel with the mounting plate.

According to a further embodiment, the at least one first plug contact and the second plug contact comprise a female plug and a male plug and/or a pair of plugs. As a result, the at least one first plug contact and the second plug contact can be provided as a pair of plugs, consisting of a female plug and a male plug. In particular, a female plug and a male plug can be formed by means of a banana plug or the like and a corresponding mating plug. Furthermore, the at least one first plug contact and the second plug contact can be formed in pairs in each case so that the first plug contact comprises e.g. two banana plugs and the second plug contact comprises two mating plugs for banana plugs.

According to a further embodiment, the at least one securing assembly transfers a portion or all of the weight of the at least one luminous body to the mounting structure. As a result, it is possible for the securing assembly to decrease the mechanical loading of the at least one first plug contact and the second plug contact or to transfer the weight of the at least one luminous body completely to the mounting structure.

According to a further embodiment, the first element has, in a depth direction oriented perpendicularly with respect to the rear side of the at least one luminous body, a portion which protrudes into the at least one luminous body. The protruding portion can be located in a region of the luminous body which is used for forming a specific directional characteristic, whereby the radiation behavior could be influenced. In order to avoid or minimise the influence, provision can be made that the expansion of the protruding portion in the depth direction is less than half, in particular one quarter and in particular one eighth, of the expansion of the at least one luminous body in the depth direction.

According to a further embodiment, the first element has a portion which protrudes into the at least one luminous body and which is arranged with the light sources in one plane. In particular, this plane can be arranged in parallel with the rear side of the at least one luminous body.

According to a further embodiment, the first element of the at least one securing assembly has a reflective surface which in particular has substantially isotropic or diffuse light scattering. This is e.g. advantageous when the first element is located in a region of the luminous body which is used for forming a specific directional characteristic, whereby the radiation behavior could be influenced. The reflective surface can minimise the influence upon the directional characteristic.

According to a further embodiment, the first element of the at least one securing assembly and the at least one luminous body are integrally connected to one another and/or the second element of the at least one securing assembly and the mounting structure are integrally connected to one another. In this case, e.g. the first element of the at least one securing assembly and the at least one luminous body and/or the second element of the at least one securing assembly and the mounting structure can each be formed from one part, e.g. by means of an injection-moulding method or other shape-forming methods.

According to a further embodiment, the first element of the at least one securing assembly and the at least one luminous body and/or the second element of the at least one securing assembly and the mounting structure are connected to one another in a positive-locking manner and/or by means of a screw connection, rivet connection, key connection, snap-action connection or adhesive connection of a combination thereof. Furthermore, the connection can be established by means of a crimped connection or fused connection.

According to a further embodiment, the first element of the at least one securing assembly is directly connected to a light-transmissive and light-diffusing part of the at least one luminous body, through which light irradiated by the light sources passes. The light-transmissive and light-diffusing part can be used directly and mainly for forming the directional characteristic, in particular for producing a homogeneous directional characteristic. The direct connection of the parts renders it possible to form the luminous body without any further housing which is not used for forming the directional characteristic. In particular, the direct connection can be formed by melting, adhesion and/or press-fitting. Furthermore, the first element can be embedded into the light-transmissive and light-diffusing part.

According to a further embodiment, the first element and the second element of the at least one securing assembly comprise one of the first and/or the second plug contacts. In this case, the securing assemblies can be configured to assume the functions of the first and second plug contact, i.e. to provide in particular electrically conductive connections which can be plugged together for supplying energy to the luminous bodies. In this case, provision can be made in particular that each luminous body comprises at least two securing assemblies which are connected or can be connected to one power circuit.

According to a further embodiment, the light sources comprise incandescent light sources and/or light-emitting diodes. The light sources can be arranged in particular in the interior of the at least one luminous body and the light produced by the light sources can exit through the front side, rear side or other sides of the at least one luminous body. In particular, the light sources can be arranged such that one or a plurality of these sides appear to be as homogeneously luminescent as possible.

According to a further embodiment, the at least one luminous body consists substantially of a material which can comprise synthetic materials, in particular acrylic glass but also metals.

According to a further embodiment, the at least one luminous body is a luminous character, in particular a luminous letter and/or a luminous numeral, wherein the luminous character has a front side which, in plan view, is in the form of a letter or a numeral of an alphabet. In particular, the at least one luminous body can be in the form of the letters A-Z, a-z and the numerals 0-9. In this manner, writing can be provided from any number of luminous bodies. Such arrangements of one or a plurality of luminous bodies can be used e.g. for advertising purposes, information purposes or for artistic design.

BRIEF DESCRIPTION OF THE DRAWINGS

The forgoing as well as other advantageous features of the disclosure will be more apparent from the following detailed description of exemplary embodiments with reference to the accompanying drawings. It is noted that not all possible embodiments necessarily exhibit each and every, or any, of the advantages identified herein.

DETAILED DESCRIPTION OF EXEMPLARY EMBODIMENTS

Figure 1:
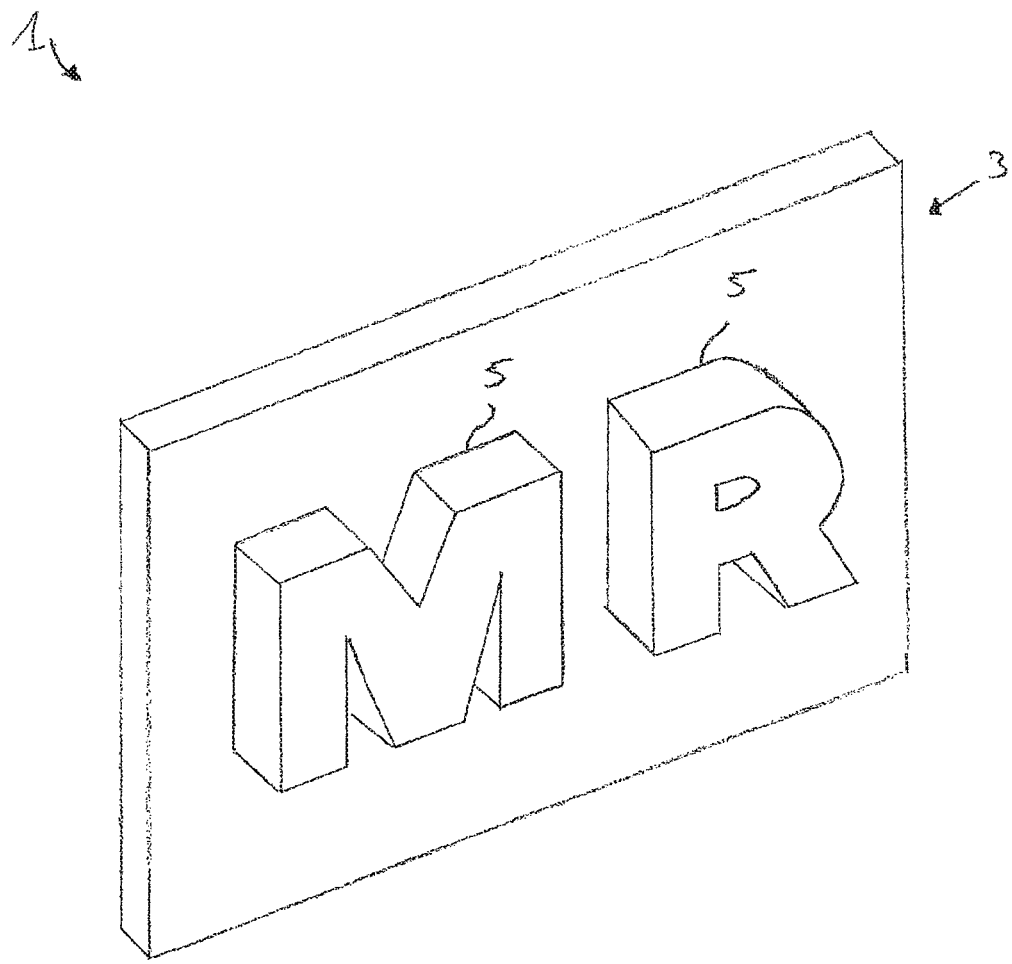
FIG. 1 shows a perspective, schematic view of a lighted display panel system.

In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

Embodiments of the invention will be explained hereinafter in conjunction with the figures. In this case, components which correspond in terms of their structure and function are designated by like reference signs which have identical numerals. Therefore, in order to describe the components, reference is also made to the entirety of the preceding and following description in each case.

FIG. 1 shows a perspective, schematic view of a lighted display panel system 1. The lighted display panel system 1 comprises a mounting structure 3 and two luminous bodies 5 which in this embodiment are luminous letters which, in plan view, are in the form of the letters M and R. However, the luminous bodies 5 can also be in the form of other letters and in particular numerals, e.g. A-Z, a-z and 0-9 and include the letters and numerals of other alphabets. A lighted display panel system can comprise a multiplicity of luminous bodies which are arranged on one or a plurality of mounting structures so that writing, character strings, words and sentences, but also logos and other characters can be displayed.

Figure 2:
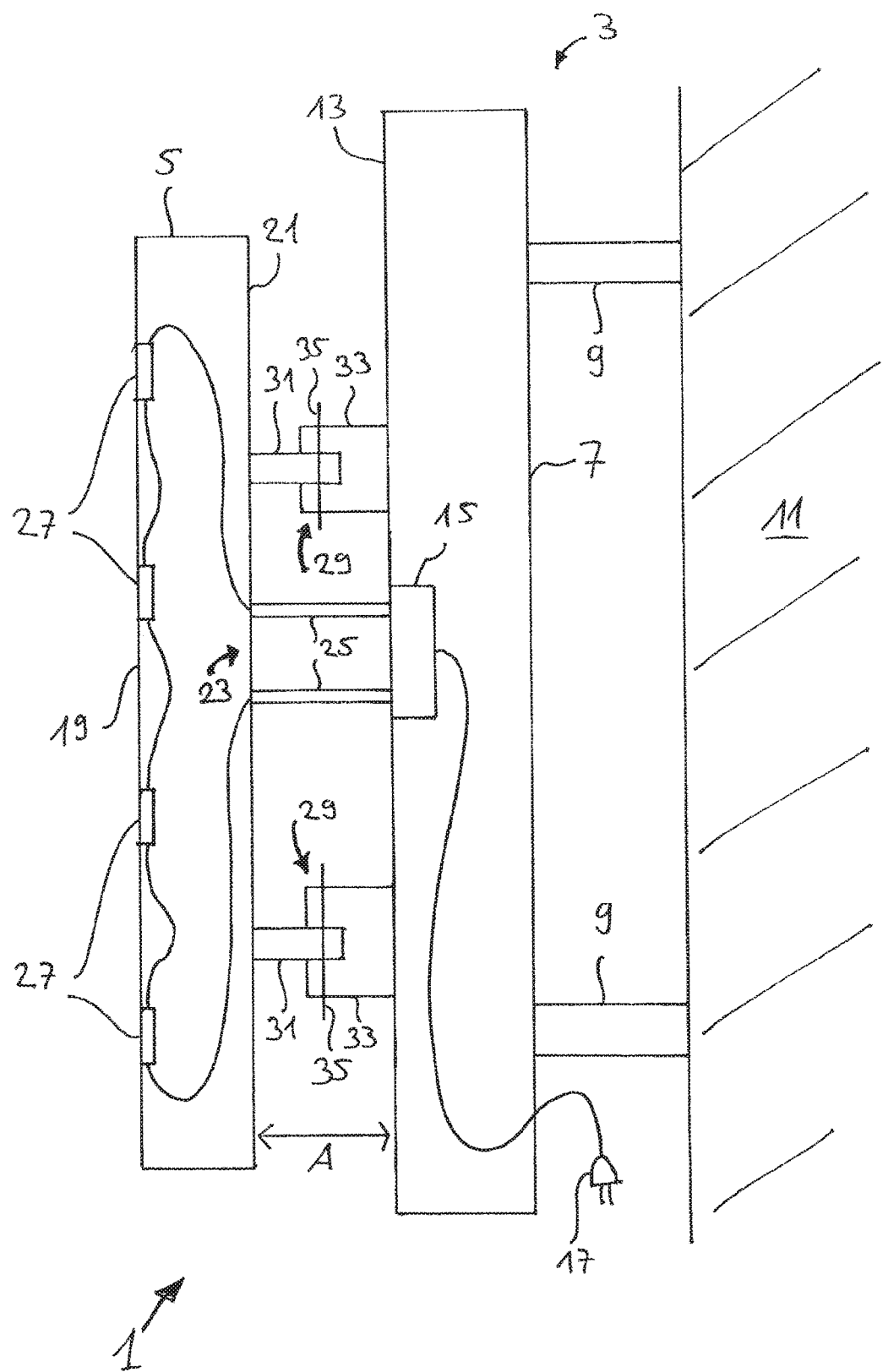
FIG. 2 shows a cross-sectional view from the side of the lighted display panel system illustrated in FIG. 1.

FIG. 2 shows a view from the side of the lighted display panel system 1 illustrated in FIG. 1. The mounting structure 3 comprises a mounting plate 7 which is attached to a wall 11 by means of a support 9, wherein the wall 11 is illustrated by lines of shading. The mounting plate 7 has a front side 13 which faces towards the luminous bodies 5. By means of the support 9, the mounting plate 7 and therefore the mounting structure 3 can be arranged at a distance from the wall 11. However, it is not necessary for the mounting plate to be arranged at a distance from the wall and alternatively the wall 11 can be e.g. a front plate or the like. However, as an alternative a front plate or the wall 11 can also be prepared such that they are used as the mounting structure. In such a case, the front plate or the wall 11 itself corresponds to the mounting plate and the at least one first plug contact is arranged on the front side of the front plate or the wall 11.

Furthermore, the mounting structure 3 comprises a first plug contact 15 which is arranged on the front side 13 of the mounting plate 7 and is used for providing a mechanical and electrical connection option for the luminous bodies 5. Furthermore, the mounting structure 3 comprises a power supply connection 17 which is electrically connected to the first plug contact 15 and which, in turn, can itself be connected to a power supply.

The luminous body 5 comprises a front side 19 and a rear side 21. Furthermore, the luminous body 5 comprises a second plug contact 23 which is arranged on the rear side 21 and which can be plugged together with and electrically connected to the first plug contact 15. In this embodiment, the second plug contact 23 consists of a pair of banana plugs 25. However, the first plug contact and the second plug contact can also be produced by means of another conventional plug. Furthermore, the luminous body 5 comprises a plurality of light sources 27 which are electrically connected to the second plug contact 23. Therefore, the light sources 27 can be electrically connected to the power supply connection 17 if, as shown in FIG. 2, the first plug contact 15 is connected to the second plug contact 23.

Furthermore, the lighted display panel system 1 comprises two securing assemblies 29 which secure the luminous bodies 5 on the mounting structure 3. The securing assemblies 29 comprise a first element 31, a second element 33 and a third element 35. The first element 31 is fixedly connected to the rear side 21 of the luminous body 5 and the second element 33 is fixedly connected to the front side 13 of the mounting plate 7. The third element 35 is configured, as explained in detail hereinafter, to connect the first element 31 and the second element 33 to one another in a positive-locking manner.

The securing assembly 29 is configured such that the positive-locking connection is produced if the luminous body 5 is joined together with the mounting structure 3. The positive-locking connection can be released exclusively by removing the third part 35 of the securing assembly 29. Preferably, the third element 35 of the securing assembly 29 can be released in a direction in parallel with the mounting plate 7. In order to prevent the securing assembly 29 from being easily released, a distance A between the rear side 21 of the luminous body 5 and the front side 13 of the mounting plate 7 is less than a predetermined value which preferably is less than 5 cm, less than 3 cm, less than 1 cm or less than 0.5 cm. Other values are possible according to the circumstances of the intended use.

Figure 3:
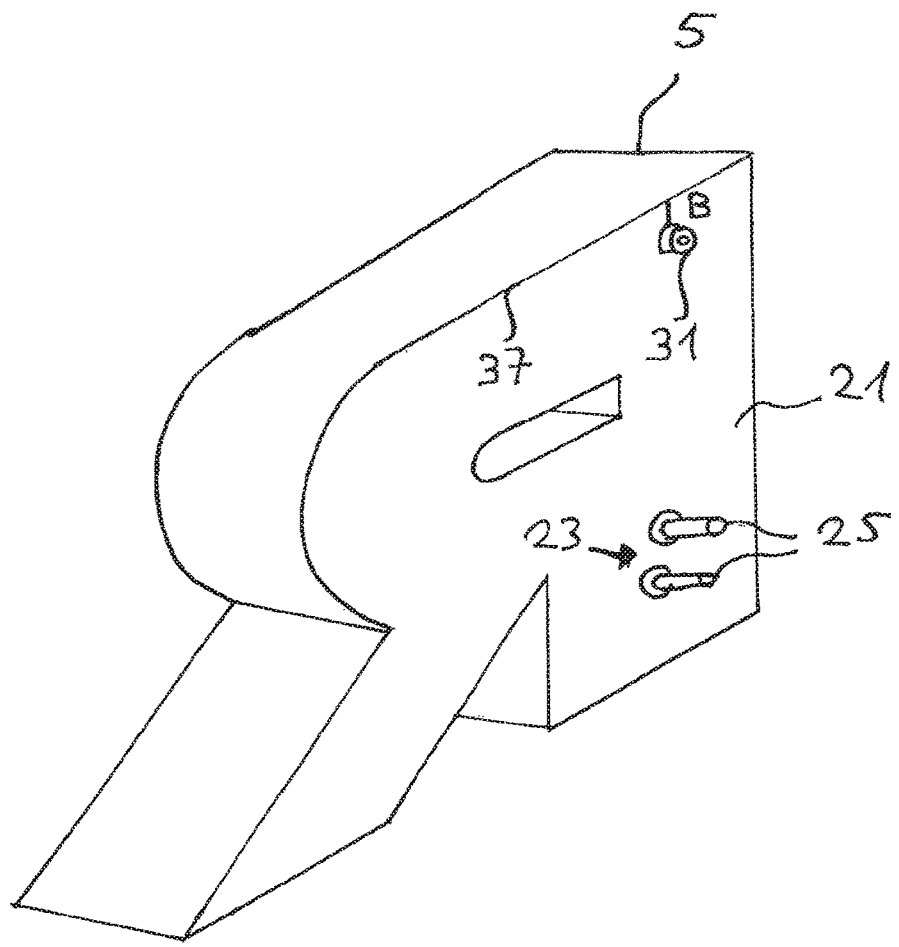
FIG. 3 shows a perspective, schematic view of a luminous body with a view onto the rear side of the luminous body.

FIG. 3 shows a perspective, schematic view of a luminous body 5 with a view onto the rear side 21 of the luminous body 5. Arranged on the rear side 21 of the luminous body 5 are the second plug contact 23, which is formed as a pair of banana plugs 25, and the first element 31 of a securing assembly. In order to make it more difficult to release the positive-locking connection, the first element 31 is arranged on the rear side 21 of the luminous body 5 at a distance from an edge which defines the rear side 21. Preferably, a minimum distance B between the peripheral edge 37, which defines the rear side 21 of the luminous body 5, and the first element 31 is greater than a determined value which preferably is greater than 1 cm, greater than 2 cm, greater than 3 cm, greater than cm or greater than 10 cm. Other values are possible according to the circumstances of the intended use.

In order to make it even more difficult to release the positive-locking connection, the ratio of the distance A illustrated in FIG. 2 to the distance B illustrated in FIG. 3 can be less than 1, less than ¾, less than ½, less than ¼, less than ⅕ or less than ⅙. Other values are possible according to the circumstances of the intended use.

Figure 4A:
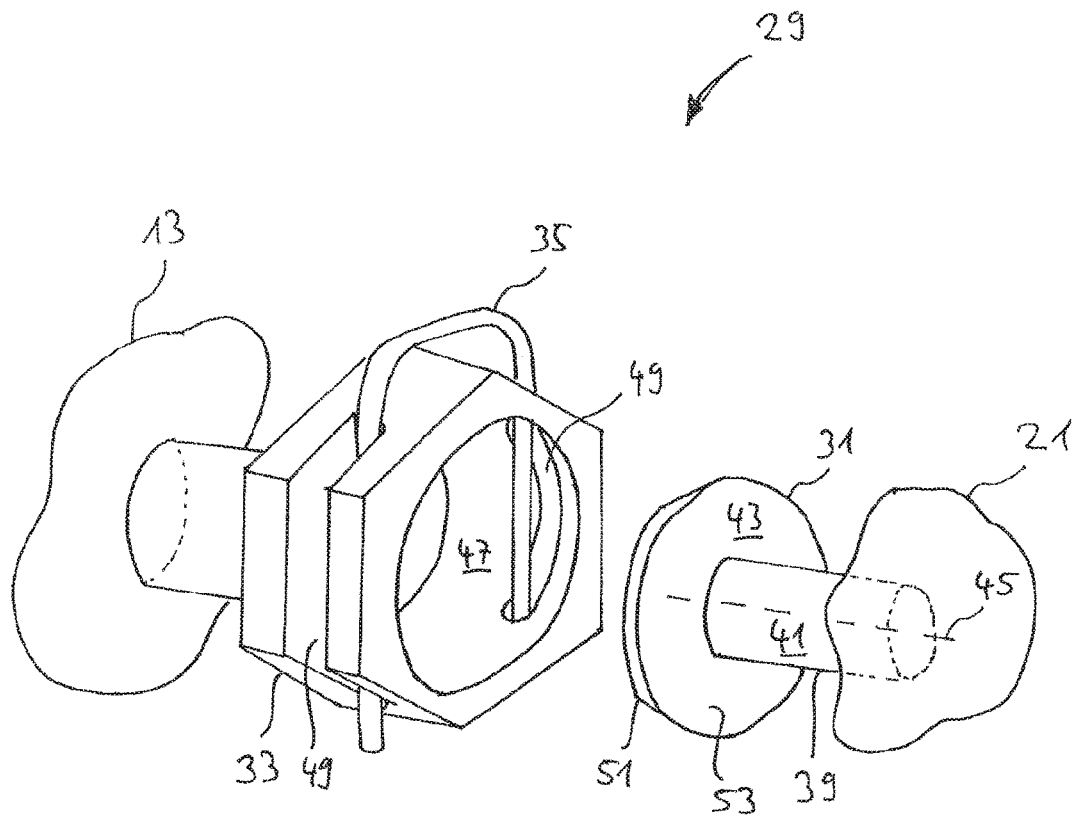
FIG. 4a shows a perspective, schematic view of a securing assembly.
Figure 4B:
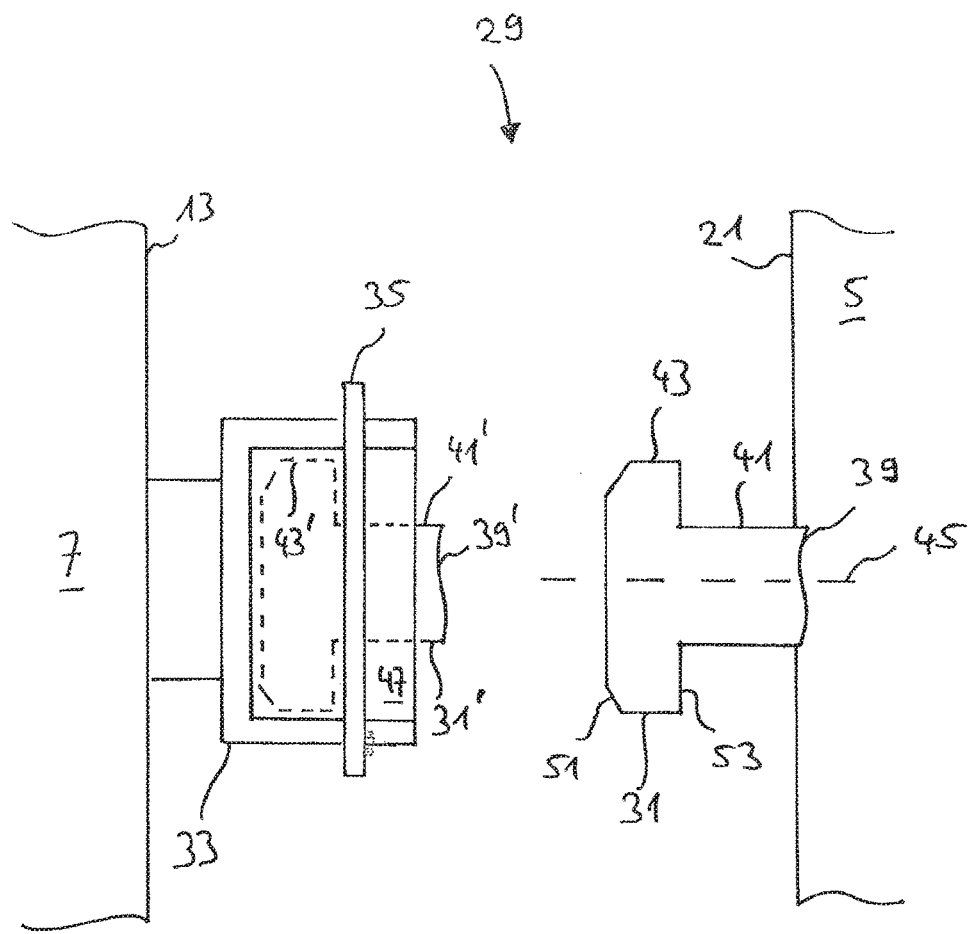
FIG. 4b shows a schematic, cross-sectional view from the side of the securing assembly shown in FIG. 4a, and FIG. 4c shows a schematic, plan view of the securing assembly shown in FIG. 4b.
Figure 4C:
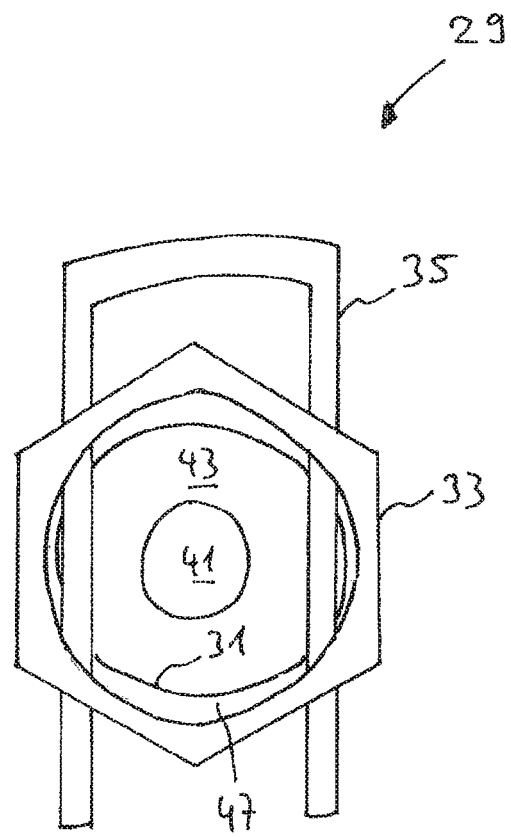

FIG. 4a shows a perspective, schematic view of one embodiment of a securing assembly 29 in a first state in which the securing assembly is released, i.e. a first element 31 is arranged at a distance from the second element 33. FIG. 4b shows a schematic, cross-sectional view from the side of the securing assembly 29 illustrated in FIG. 4a, wherein the securing assembly is illustrated in the first state with the first element 31. Moreover, FIG. 4b shows a second state of the securing assembly 29 in which the securing assembly is closed, i.e. the first element 31' and the second element 33 are not arranged at a distance from one another and a positive-locking connection exists between the first element 31 and the second element 33. The second state is illustrated by the first element 31'. FIG. 4c shows a schematic view of the securing assembly 29 in the second state which is shown in FIG. 4c by the first element 31' illustrated by the broken line, in plan view of the second element 33 of the securing assembly 29, wherein for improved clarity the rear side of the luminous body has been omitted.

The securing assembly 29 comprises the first element 31, the second element 33 and a third element 35. The first element 31 is connected to rear side 21 of a luminous body and the second element 33 is fixedly connected to the front side 13 of a mounting plate, wherein the front side and the rear side are indicated merely as sections. The first element 31 of the securing assembly 29 comprises a pin 39 which has an proximal portion 41 and an distal portion 43 which are oriented in a longitudinal direction 45 of the pin 39. The longitudinal direction 45 of the pin 39 is illustrated by a broken line. The distal portion 43 has a larger width in comparison with the proximal portion 41, wherein the width is an expansion of the pin 39 measured in a direction oriented perpendicularly with respect to the longitudinal direction 45.

The second element 33 of the securing assembly 29 has a portion which is formed as a hexagon. The second element 33 comprises a pin receiver 47 which is formed as a recess in the portion formed as a hexagon. The recess 47 is of such a size that the first element 31 can be accommodated completely with the distal portion 43 and at least partially with the proximal portion 41 in the pin receiver 47, as illustrated in FIG. 4b by the first element 31'. Furthermore, the second element 33 has apertures 49 and the third element 35 of the securing assembly 29 is configured to engage into the apertures 49. In this embodiment, the third element 35 is a substantially U-shaped splint which can be arranged in a direction in parallel with the mounting plate or its front side 13 in the apertures 49 and thus on the second element 33 and can be removed from the second element 33 in the same manner. A part of the third element 35 which passes through the apertures 49 protrudes into the pin receiver 47, thus enabling a positive-locking connection to be established.

In the first state of the securing assembly which is shown in FIG. 4a, the first element 31 of the securing assembly 29 is arranged at a distance from the second element 33 of the securing assembly 29, the third element 35 is arranged on the second element 33 in a position configured for securing purposes and a positive-locking connection is not provided between the first element 31 and the second element 33.

The position—configured for securing purposes—of the third element 35 is characterized by the fact that the third element 35 is arranged on the second element 33 such that a positive-locking connection is produced between the first element 31 and the second element 33 if the pin 39 is introduced at least with a part of the proximal portion 41 into the pin receiver 47 and the third element 35 engages behind the distal portion 43 of the pin 39 at the level of the proximal portion 41 of the pin 39. In this embodiment, the third element is arranged in the position configured for securing purposes if the third element 35 engages into the apertures 49 and protrudes into the pin recess and the first element 31 is arranged at a distance from the second element 33.

The positive-locking connection between the first element 31 and the second element 33 can be established in that the securing assembly is transferred from the first state to the second state. For this purpose, the first element 31 is positioned relative to the second element 33 such that the third element 35 connects the first element 31 to the second element 33 in a positive-locking manner.

This renders it possible to prepare the second element 33 and the third element 35 in the position shown in FIG. 4a and only thereafter to establish the positive-locking connection in that the first element 31 is positioned relative to the second element 33 such that the positive-locking connection is produced.

According to the embodiment of FIGS. 4a and 4b, the second state is achieved in that the pin 39 is introduced into the pin recess 47 and the third element 35 engages behind the distal portion 43 of the pin 39 at the level of the proximal portion 41 of the pin 39. This state is shown in FIG. 4b by the first element 31' illustrated by the broken line. In particular, the third element 35 of the securing assembly 29 engages behind the distal portion 43' of the pin 39' at the level of the proximal portion 41', whereby the positive-locking connection is produced.

The third element 35 is configured such that the positive-locking connection can be established even though the third element 35 is already arranged on the second element 33 in the position configured for securing purposes. For example, the third element 35 is flexible so that it is displaced by the first element 31, the securing assembly is transferred to the second state.

FIG. 4c illustrates the configuration of the positive-locking connection and the securing assembly in the second state, wherein the securing assembly is shown in a plan view of the second element 33. After the parts of the third element 35, which protrude into the pin recess 47, have been displaced into the apertures when the pin 39 is being introduced into the pin receiver 47, the third element 35 engages, after the displacement ends, behind the distal portion 43 of the pin 39 in the proximal portion 41 of the pin 39, thus producing the positive-locking connection.

Therefore, such a securing assembly renders it possible firstly to prepare the mounting structure in that the third element 35 of the mounting assembly 29 is arranged in the position configured for securing purposes, and subsequently to install the luminous body on the mounting structure with a securing action in that the securing assemblies are transferred to the second state.

The first element, the second element and the third element are formed or prepared in such a way that the closed, positive-locking connection provided by the securing assembly can be released in a damage-free manner exclusively by removing the third element from the position configured for securing purposes. In particular, the positive-locking connection can be released in a damage-free manner by virtue of the fact that the U-shaped splint is drawn out of the apertures 49. However, the release of the positive-locking connection is made more difficult, as already explained above, by suitably selecting the distance A shown in FIG. 2 and the distance B shown in FIG. 3. In particular, this is made more difficult such that the positive-locking connection cannot be released exclusively by hand and it can only be released using special tools.

In the embodiment of FIGS. 4a to 4c, the securing assembly is formed in such a way that the positive-locking connection prevents displaceability of the first element 31 and of the second element 33 relative to one another in three translational directions. However, by suitably forming the first element and the second element, e.g. by forming the pin and the pin recess in the form of angular shapes, it is also possible to prevent degrees of rotational freedom. Moreover, the first element 31 and the second element 33 can be designed such that not all translational and rotational directions are prevented but instead a smaller number of these degrees of freedom are prevented.

In order to be able to establish the positive-locking connection in a simpler manner, the third element 35 can be bendable and/or the first element 31 can have flattened sides 51 at the end of the distal portion 43 in order to be able to displace the third element 35 more easily upon introduction into the pin recess. The surfaces 53 of the first element 31 opposite the sides 51 are designed in such a way that, if the positive-locking connection is established, they oppose removal of the first element 31 from the second element 33 if the third element 35 is arranged in the position configured for securing purposes.

Simple modifications of the embodiments previously set forth are possible. For example, the first element of the securing assembly can be arranged on the front side of the mounting plate and the second element of the securing assembly can be arranged on the rear side of the luminous body.

Figure 5:
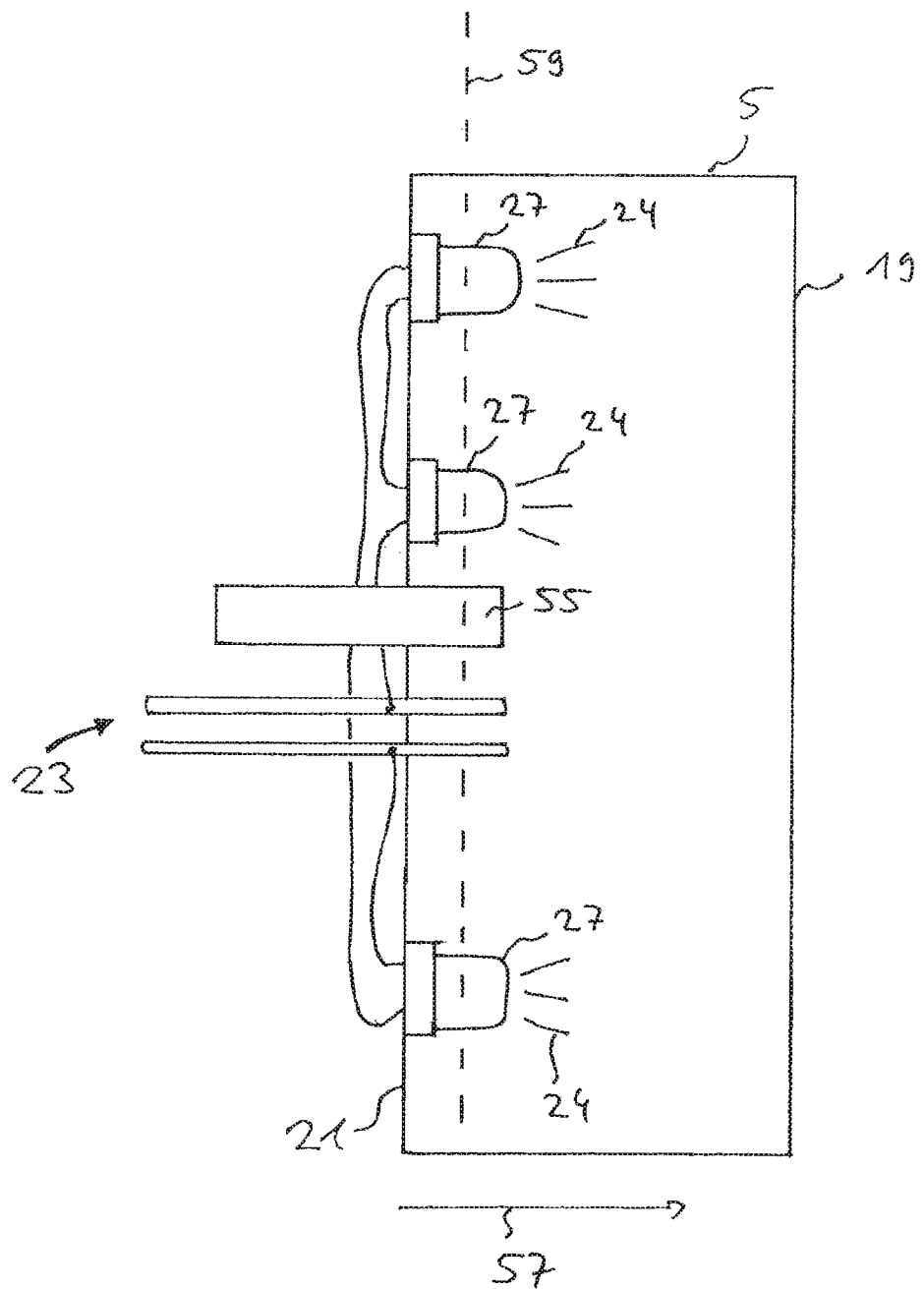
FIG. 5 shows a schematic, cross-sectional view of one embodiment of a luminous body.

FIG. 5 shows a schematic, cross-sectional view of one embodiment of a luminous body 5. In the luminous body 5, a plurality of light sources 27, e.g. light-emitting diodes, are arranged on the rear side 21 of the luminous body 5 and are connected to the second plug contact 23 by means of lines. The light sources emit in the direction of the front side 19 of the luminous body, which is indicated by light beams 24. In the example shown, the lines run outside the luminous body 5. Alternatively, the lines can also be arranged in the interior of the luminous body 5.

The luminous body 5 consists of a light-transmissive material which substantially comprises acrylic glass. The material has the property of transporting the light emanating from the light sources in a particular manner onto the front side 21. Therefore, the material can influence the distribution of the light which can be seen on the front side 21.

Therefore, a desired directional characteristic emanating from the front side 21 can be produced.

The first element 31 of a securing assembly has a portion 55 which protrudes into the luminous body 5. Under certain circumstances, this can negatively influence the directional characteristic of the luminous body 5. In order to minimise the influence of the portion 55 upon the directional characteristic, the expansion of the portion 55 in a depth direction 57, which is oriented perpendicularly with respect to the rear side 21, is restricted. In particular, the expansion of the portion 55 in the depth direction 57 is less than half, in particular less than one quarter and in particular less than one eighth of the expansion of the luminous body 5 in the depth direction. Moreover, the portion 55 and the light sources 27 are arranged in one plane 59 which in particular can be plane-parallel with respect to the rear side 21.

To further minimise the influence of the first element 31 upon the directional characteristic, the first element 31 has a reflective surface at least in the region 55. For example, the first element 31 can consist of metal or can have a metallic surface.

Figure 6:
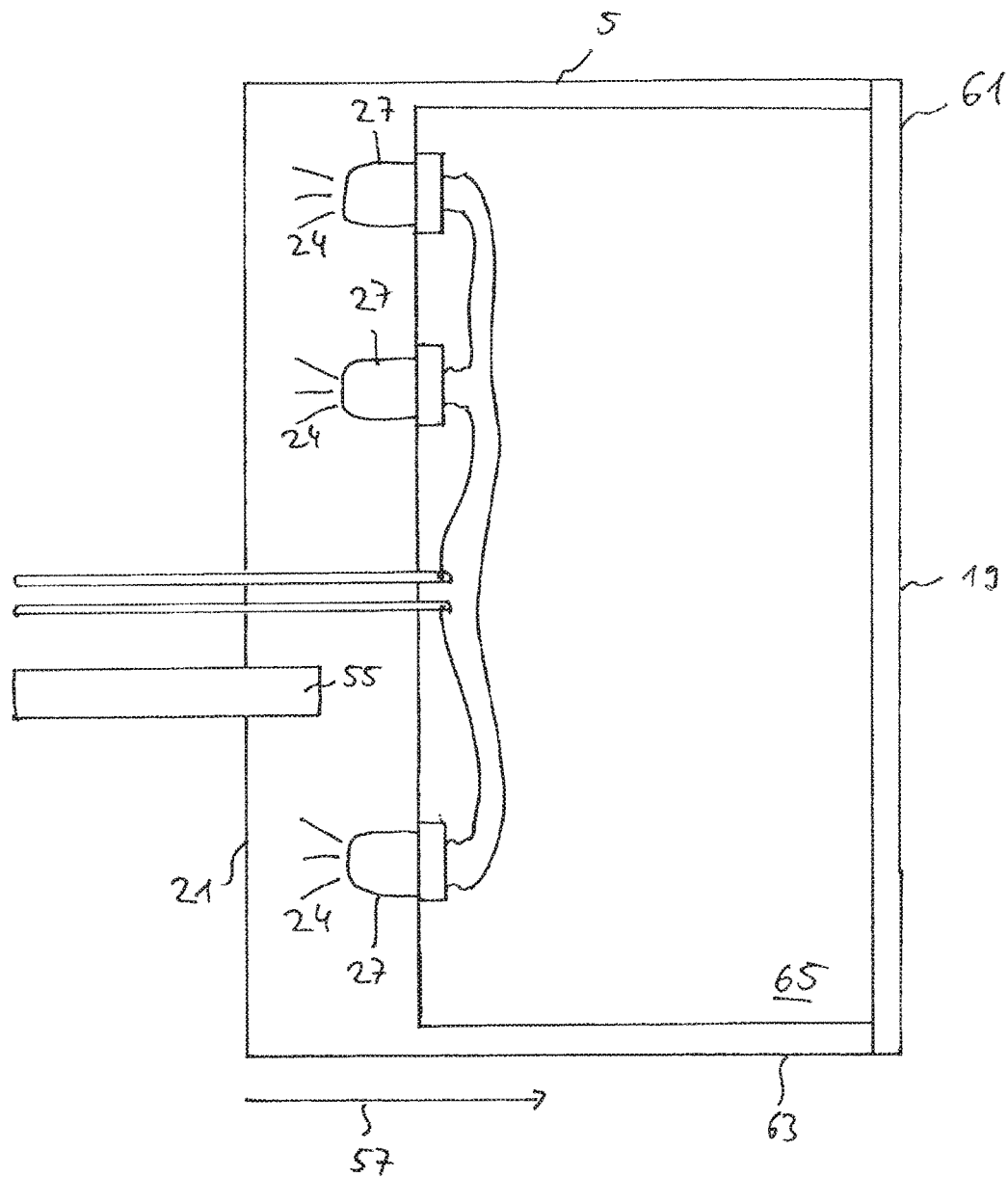
FIG. 6 shows a schematic, cross-sectional view of a further embodiment of a luminous body.

FIG. 6 shows a schematic, cross-sectional view of a further embodiment of a luminous body. The luminous body 5 comprises a plate 61 and a body 63, wherein the plate 61 is connected to the body 63 and provides the front side 19 of the luminous body. The plate 61 and the body 63 consist of a material which substantially comprises a synthetic material, in particular acrylic glass. In the interior of the luminous body, an proximal space 65 is defined by the plate 61 and the body 63. The proximal space 65 consists of a material which can comprise air but also synthetic material.

A plurality of light sources 27 are arranged in the body 63 and emit light in the direction of the rear side 21 of the luminous body 5, which is indicated by the light beams 24. The rear side 21 of the luminous body 5 is provided by the body 63 and is formed to reflect light, which is radiated by the light sources 27, in the direction of the front side 19 of the luminous body.

As in the embodiment illustrated in FIG. 5, the first element 31 of a securing assembly has a portion 55 which protrudes into the luminous body 5. Under certain circumstances, this can negatively influence the directional characteristic of the luminous body 5. In order to minimise the influence of the portion 55 upon the directional characteristic, the expansion of the portion 55 in a depth direction 57, which is oriented perpendicularly with respect to the rear side 21, is restricted according to the description of FIG. 5.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

The invention claimed is:

1. A lighted display panel system comprising:
  a mounting structure including a mounting plate having a front side, at least one first plug contact arranged on the front side of the mounting plate, and a power supply connection which is electrically connected to the at least one first plug contact and which can be connected to a power supply;
  at least one luminous body including a front side and a rear side having a peripheral edge, a second plug contact arranged on the rear side of the at least one luminous body and which can be physically and electrically connected to the first plug contact, and a plurality of light sources electrically connected to the second plug contact; and
  at least one securing assembly;
  wherein the at least one luminous body is configured to be secured to the mounting structure by the at least one securing assembly;
  wherein a first element of the at least one securing assembly is fixedly connected to the rear side of the at least one luminous body;
  wherein a second element of the at least one securing assembly is fixedly connected to the front side of the mounting plate; and
  wherein a third element of the at least one securing assembly intersects the first element of the at least one securing assembly and the second element of the at least one securing assembly providing a positive-locking connection connecting the first element of the at least one securing assembly and the second element of the at least one securing assembly.

2. The lighted display panel system according to claim 1, wherein the at least one securing assembly is configured such that the positive-locking connection can be achieved by firstly arranging the third element on the second element in a position for securing purposes and by subsequently positioning the first element relative to the second element such that the third element connects the first element to the second element in a positive-locking manner.

3. The lighted display panel system according to claim 2, wherein the at least one securing assembly is configured such that the positive-locking connection provided by the at least one securing assembly can be nondestructively released only by removing of the third element of the at least one securing assembly from the position configured for securing purposes.

4. The lighted display panel system according to claim 1, wherein the at least one securing assembly is configured such that the positive-locking connection provided by the at least one securing assembly prevents a displacement of the first element of the at least one securing assembly relative to the second element of the at least one securing assembly in at least one of one translational direction, two translational directions three translational directions, one rotational direction, two rotational directions, and three rotational directions.

5. The lighted display panel system according to claim 1, wherein a distance between the rear side of the at least one luminous body and the front side of the mounting plate is less than at least one of 5 cm, 3 cm, 1 cm and 0.5 cm.

6. The lighted display panel system according to claim 1, wherein a minimum distance between the peripheral edge of the rear side of the at least one luminous body and the first element of the at least one securing assembly fixedly connected to the rear side of the at least one luminous body is greater than at least one of 1 cm, 2 cm, 3 cm, 5 cm and 10 cm.

7. The lighted display panel system according to claim 1, wherein the ratio between a distance between the rear side of the at least one luminous body and the front side of the mounting plate and a minimum distance between the peripheral edge of the rear side of the at least one luminous body and the first element of the at least one securing assembly fixedly connected to the rear side of the at least one luminous body is less than at least one of 1, $\frac{3}{4}$, $\frac{1}{2}$, $\frac{1}{4}$, $\frac{1}{5}$, and $\frac{1}{6}$.

8. The lighted display panel system according to claim 1, wherein the first element of the at least one securing assembly has an aperture;
   wherein the second element of the at least one securing assembly has an aperture; and
   wherein the third element of the at least one securing assembly is configured to engage into the apertures of the first and second elements.

9. The lighted display panel system according to claim 1, wherein one of the first element and the second element of the at least one securing assembly (29) includes a pin having a proximal portion and a distal portion;
   wherein a width of the distal portion of the pin is greater than a width of the proximal portion of the pin;
   wherein the other one of the first element and the second element of the at least one securing assembly includes a receiving element configured to receive the distal portion and at least a part of the proximal portion of the pin; and
   wherein the third element of the securing assembly is configured to be connected to the second element of the securing assembly such that, when at least a portion of the pin is inserted into the receiving element, the third element engages the distal portion of the pin at the proximal portion of the pin.

10. The lighted display panel system according to claim 1, wherein the third element of the at least one securing assembly is a substantially U-shaped splint pin.

11. The lighted display panel system according to claim 1, wherein the first plug contact and the second plug contact comprise a female plug and a male plug.

12. The lighted display panel system according to claim 1, wherein the at least one securing assembly is configured to transfer a portion or all of the weight of the at least one luminous body to the mounting structure.

13. The lighted display panel system according to claim 1, wherein the first element includes a portion protruding into the at least one luminous body.

14. The lighted display panel system according to claim 1, wherein the first element of the at least one securing assembly has a reflective surface configured to scatter incident light in isotropic directions.

15. The lighted display panel system according to claim 1, wherein the first element of the at least one securing assembly and the at least one luminous body are integrally connected to one another.

16. The lighted display panel system according to claim 1, wherein the second element of the at least one securing assembly and the mounting structure are integrally connected to one another.

17. The lighted display panel system according to claim 1, wherein the first element of the at least one securing assembly and the at least one luminous body are connected to one another by at least one of a positive-locking connection, a screw connection, a rivet connection, a key connection, a snap-action connection, crimp connection, a fused connection and an adhesive connection.

18. The lighted display panel system according to claim 1, wherein the second element of the at least one securing assembly and the mounting structure are connected to one another by at least one of a positive-locking connection, a screw connection, a rivet connection, a key connection, a snap-action connection, crimp connection, a fused connection and an adhesive connection.

19. The lighted display panel system according to claim 1, wherein the first element of the at least one securing assembly is directly connected to a light-transmissive and light-diffusing part of the at least one luminous body.

20. The lighted display panel system according to claim 19, wherein the first element of the at least one securing assembly and the light-transmissive and light-diffusing part of the at least one luminous body are directly connected to one another by at least one of melting, adhesion and press-fitting.

21. The lighted display panel system according to claim 1, wherein the first element and the second element of the at least one securing assembly comprise one of the first and the second plug contacts.

22. The lighted display panel system according to claim 1, wherein the light sources comprise incandescent light sources and light-emitting diodes.

23. The lighted display panel system according to claim 1, wherein the at least one luminous body is made of a material comprising at least one of a plastic material and an acrylic glass material.

24. The lighted display panel system according to claim 1, wherein the at least one luminous body has a shape of at least one of a character and a letter of an alphabet.

25. A lighted display panel system comprising:
   a mounting structure including a mounting plate having a front side, at least one first plug contact arranged on the front side of the mounting plate, and a power supply connection which is electrically connected to the at least one first plug contact and which can be connected to a power supply;
   at least one luminous body including a front side and a rear side having a peripheral edge, a second plug contact arranged on the rear side of the at least one luminous body and which can be physically and electrically connected to the first plug contact, and
   a plurality of light sources electrically connected to the second plug contact; and
   at least one securing assembly;
   wherein the at least one luminous body is configured to be secured to the mounting structure by the at least one securing assembly;
   wherein a first element of the at least one securing assembly is fixedly connected to the rear side of the at least one luminous body, wherein the first element of the at least one securing assembly has an aperture;
   wherein a second element of the at least one securing assembly is fixedly connected to the front side of the mounting plate, wherein the second element of the at least one securing assembly has an aperture; and
   wherein a third element of the at least one securing assembly is configured to connect the first element of the at least one securing assembly and the second element of the at least one securing assembly to one another in a positive-locking manner by engaging into the apertures of the first and second elements.

26. A lighted display panel system comprising:
   a mounting structure including a mounting plate having a front side, at least one first plug contact arranged on the front side of the mounting plate, and a power supply connection which is electrically connected to the at least one first plug contact and which can be connected to a power supply;
   at least one luminous body including a front side and a rear side having a peripheral edge, a second plug contact arranged on the rear side of the at least one luminous body and which can be physically and electrically connected to the first plug contact, and a plurality of light sources electrically connected to the second plug contact; and at least one securing assembly;

wherein the at least one luminous body is configured to be secured to the mounting structure by the at least one securing assembly;

wherein a first element of the at least one securing assembly is fixedly connected to the rear side of the at least one luminous body;

wherein a second element of the at least one securing assembly is fixedly connected to the front side of the mounting plate;

wherein a third element of the at least one securing assembly is configured to connect the first element of the at least one securing assembly and the second element of the at least one securing assembly to one another in a positive-locking manner; and wherein one of the first element and the second element of the at least one securing assembly includes a pin having a proximal portion and a distal portion;

wherein a width of the distal portion of the pin is greater than a width of the proximal portion of the pin;

wherein the other one of the first element and the second element of the at least one securing assembly includes a receiving element configured to receive the distal portion and at least a part of the proximal portion of the pin; and wherein the third element of the securing assembly is configured to be connected to the second element of the securing assembly such that, when at least a portion of the pin is inserted into the receiving element, the third element engages the distal portion of the pin at the proximal portion of the pin.

27. A lighted display panel system comprising:

a mounting structure including a mounting plate having a front side, at least one first plug contact arranged on the front side of the mounting plate, and a power supply connection which is electrically connected to the at least one first plug contact and which can be connected to a power supply;

at least one luminous body including a front side and a rear side having a peripheral edge, a second plug contact arranged on the rear side of the at least one luminous body and which can be physically and electrically connected to the first plug contact, and a plurality of light sources electrically connected to the second plug contact; and at least one securing assembly;

wherein the at least one luminous body is configured to be secured to the mounting structure by the at least one securing assembly;

wherein a first element of the at least one securing assembly is fixedly connected to the rear side of the at least one luminous body;

wherein a second element of the at least one securing assembly is fixedly connected to the front side of the mounting plate; and wherein a third element of the at least one securing assembly is configured to connect the first element of the at least one securing assembly and the second element of the at least one securing assembly to one another in a positive-locking manner, and wherein the third element of the at least one securing assembly is a substantially U-shaped splint pin.

28. A lighted display panel system comprising:

a mounting structure including a mounting plate having a front side, at least one first plug contact arranged on the front side of the mounting plate, and a power supply connection which is electrically connected to the at least one first plug contact and which can be connected to a power supply;

at least one luminous body including a front side and a rear side having a peripheral edge, a second plug contact arranged on the rear side of the at least one luminous body and which can be physically and electrically connected to the first plug contact, and a plurality of light sources electrically connected to the second plug contact; and at least one securing assembly;

wherein the at least one luminous body is configured to be secured to the mounting structure by the at least one securing assembly;

wherein a first element of the at least one securing assembly is fixedly connected to the rear side of the at least one luminous body, and wherein the first element of the at least one securing assembly has a reflective surface configured to scatter incident light in isotropic directions;

wherein a second element of the at least one securing assembly is fixedly connected to the front side of the mounting plate; and wherein a third element of the at least one securing assembly is configured to connect the first element of the at least one securing assembly and the second element of the at least one securing assembly to one another in a positive-locking manner.

* * * * *